(12) United States Patent
Liu

(10) Patent No.: US 7,430,116 B2
(45) Date of Patent: Sep. 30, 2008

(54) HARD DISK DRIVE CASE

(75) Inventor: Han Liu, Fremont, CA (US)

(73) Assignee: Antec, Incorporated, Fremont, CA (US)

( * ) Notice: Subject to any disclaimer, the term of this patent is extended or adjusted under 35 U.S.C. 154(b) by 0 days.

(21) Appl. No.: 11/827,845

(22) Filed: Jul. 12, 2007

(65) Prior Publication Data
US 2008/0062636 A1 Mar. 13, 2008

(30) Foreign Application Priority Data
Sep. 12, 2006 (TW) .............................. 095216202 U

(51) Int. Cl.
*H05K 5/00* (2006.01)
*H05K 7/00* (2006.01)
*H05K 7/20* (2006.01)
*G06F 1/16* (2006.01)
*G06F 1/20* (2006.01)
*B65D 85/00* (2006.01)

(52) U.S. Cl. ..................... 361/685; 361/687; 361/688; 361/695; 206/701

(58) Field of Classification Search ................ 361/685, 361/687–688; 206/701; 369/75.11, 75.21, 369/76, 77.11, 77.21; 720/652, 601
See application file for complete search history.

(56) References Cited

U.S. PATENT DOCUMENTS

| | | | | |
|---|---|---|---|---|
| 6,560,099 B1 * | 5/2003 | Chang | ........................ | 361/685 |
| 6,891,721 B2 * | 5/2005 | Huang | ........................ | 361/685 |
| 7,012,805 B2 * | 3/2006 | Shah et al. | ................... | 361/685 |
| D534,910 S * | 1/2007 | Weiher et al. | .............. | D14/356 |
| 7,251,131 B2 * | 7/2007 | Shah et al. | ................... | 361/685 |
| 7,333,328 B2 * | 2/2008 | Funawatari et al. | ......... | 361/685 |
| 7,359,190 B2 * | 4/2008 | Szolyga | ...................... | 361/686 |
| 2001/0001529 A1 * | 5/2001 | Behl et al. | ................ | 312/223.1 |
| 2002/0097556 A1 * | 7/2002 | Lee | ............................. | 361/685 |
| 2002/0126454 A1 * | 9/2002 | Kutaragi et al. | ............. | 361/724 |
| 2005/0013110 A1 * | 1/2005 | Shah et al. | ................... | 361/685 |
| 2006/0181845 A1 * | 8/2006 | Shah et al. | ................... | 361/685 |
| 2007/0030646 A1 * | 2/2007 | Hsu | ........................... | 361/687 |

* cited by examiner

*Primary Examiner*—Jayprakash N Gandhi
*Assistant Examiner*—Anthony M Haughton
(74) *Attorney, Agent, or Firm*—Charles E. Baxley

(57) ABSTRACT

A hard disk drive case has a base, a cover and a fan assembly. The base has an inner surface, a sidewall and an outlet formed through the sidewall of the base. The cover is mounted onto the base and has an inlet formed through the cover. The fan assembly is mounted on the inner surface of the base, is surrounded by the sidewall of the base and has a bracket and a hood. The bracket has an airway and a fan. The airway is flared and communicates with the outlet. The fan is mounted in the airway. The hood corresponds to and covers the airway to form a chamber communicating with the outlet and has a hole defined through the hood, corresponding to the fan and allowing the fan to extract air from the inlet and to guide air toward the outlet efficiently.

6 Claims, 4 Drawing Sheets

HARD DISK DRIVE CASE

BACKGROUND OF THE INVENTION

1. Field of Invention

The present invention relates to a hard disk drive (HDD) case, and more particularly to an HDD case that has a fan assembly to enhance flow inside the hard disk drive case to dissipate heat quickly.

2. Description of the Related Art

A hard disk drive (HDD) can be mounted in an HDD case with a fan assembly.

One conventional HDD case is rectangular and has a chamber, an inlet, an outlet and at least one axial-flow fan. The chamber receives a HDD. The inlet is defined through the HDD case. The outlet is defined through the HDD case. The axial-flow fan is mounted in the chamber upon or below the HDD to extract air from the inlet to the HDD and then exhaust the air and heat from the outlet. However, the axial-flow fan may cause turbulence near the outlet in the HDD case to lead to poor heat dissipation efficiency.

Another conventional HDD case is rectangular and has a chamber, an inlet, an outlet and at least one axial-flow fan. The chamber receives a HDD. The inlet is defined through the HDD case. The outlet is defined through the HDD case. The axial-flow fan is mounted in the chamber in front of or behind the HDD to extract air from the inlet to the HDD and then exhaust the air from the outlet. However, the axial-flow fan may cause turbulence in the HDD case leads to poor heat dissipation efficiency and further causes loud noise.

Another conventional HDD case is rectangular and has a chamber, a top, a bottom, four sides, an inlet, an outlet and at least one heat conductor. The chamber receives a HDD. The HDD generates heat. The inlet is defined through the HDD case. The outlet is defined through the HDD case. The heat conductor may be made of metal and may be mounted on the top, the bottom or each side to conduct heat out of the chamber of the HDD case. However, the heat conductor leads to poor heat dissipation efficiency.

Thus, the conventional HDD case can not dissipate heat efficiently, so the HDD may be overheated to damage.

To overcome the shortcomings, the present invention provides a hard disk drive case to mitigate or obviate the aforementioned.

SUMMARY OF THE INVENTION

The primary objective of the present invention is to provide a hard disk drive case that has a fan to enhance flow inside the hard disk drive case to dissipate heat quickly.

To achieve the objective, a hard disk drive case in accordance with the present invention has a base, a cover and a fan assembly. The base has an inner surface, a sidewall and an outlet formed through the sidewall of the base. The cover is mounted onto the base and has an inlet formed through the cover. The fan assembly is mounted onto the inner surface of the base, is surrounded by the sidewall of the base and has a bracket and a hood. The bracket has an airway and a fan. The airway is flared and communicates with the outlet. The fan is mounted in the airway. The hood corresponds to and covers the airway to form a chamber communicating with the outlet and has a hole defined through the hood, corresponding to the fan and allowing the fan to extract air from the inlet and guide air toward the outlet efficiently.

Other objectives, advantages and novel features of the invention will become more apparent from the following detailed description when taken in conjunction with the accompanying drawings.

DETAILED DESCRIPTION OF THE INVENTION

Figure 1:
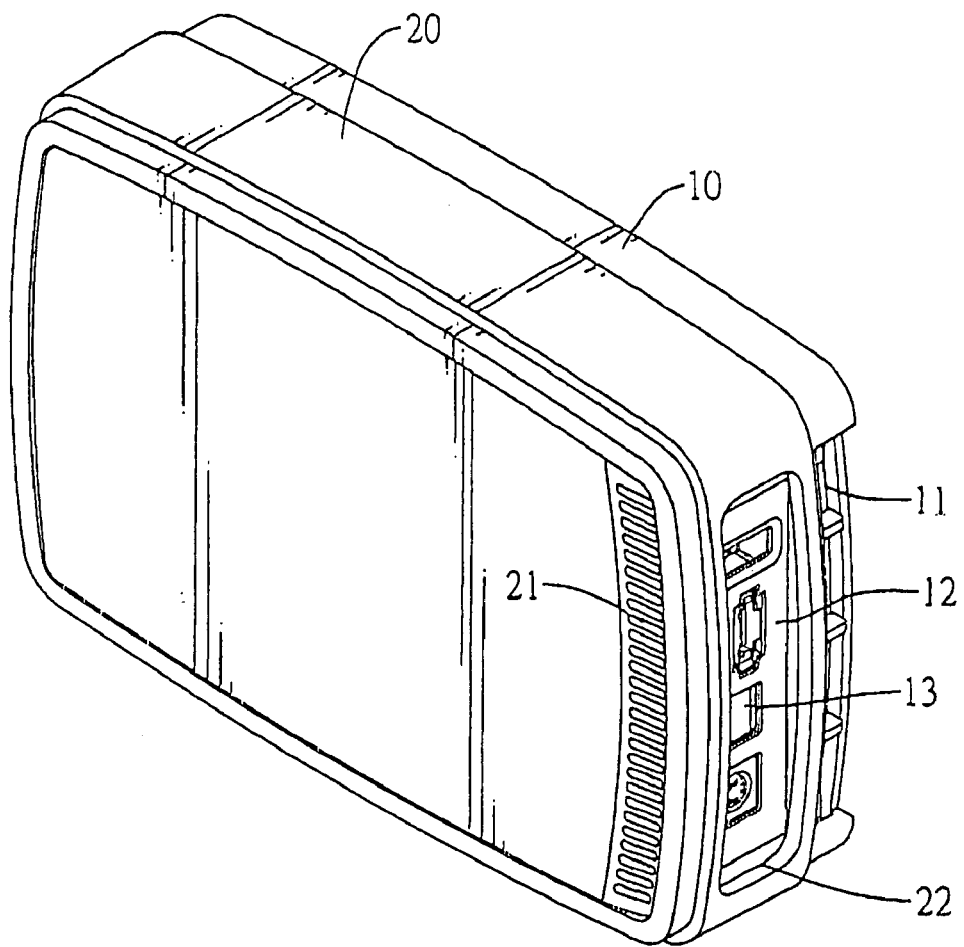
FIG. 1 is a perspective view of a hard disk drive (HDD) case in accordance with the present invention with a hard disk drive.
Figure 2:
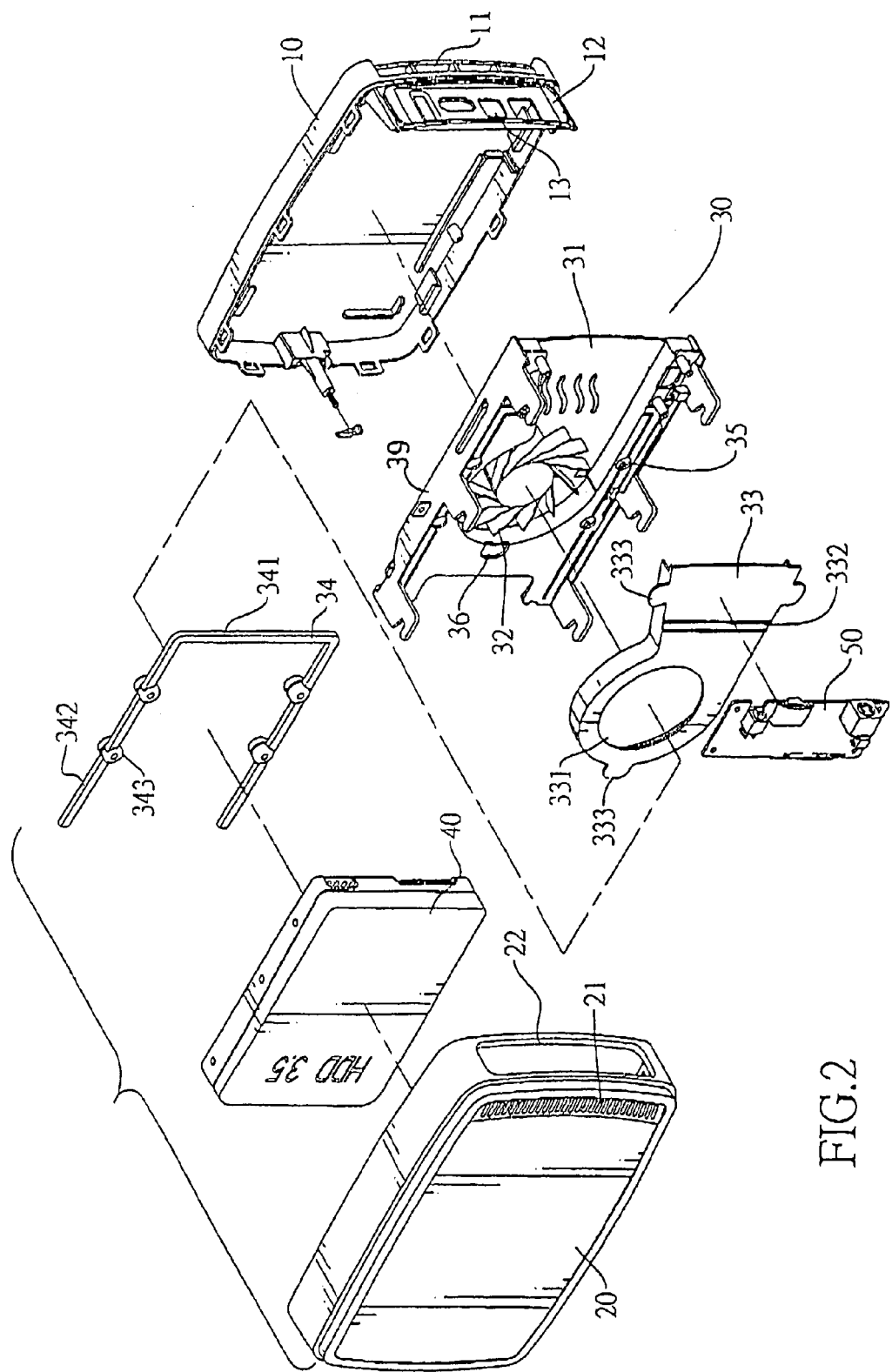
FIG. 2 is an exploded perspective view of the HDD case in FIG. 1.

With reference to FIGS. 1 and 2, a hard disk drive (HDD) case in accordance with the present invention may receive an HDD (40), has a base (10), a cover (20), a fan assembly (30) and may further have a circuit board (50).

The base (10) may be rectangular and has an inner surface, at least one sidewall and an outlet (11). The at least one sidewall has a mounting board (12). When the base (10) is rectangular there are four sidewalls. The mounting board (12) protrudes from one of the at least one sidewall and has multiple inserting holes (13) defined through the protruding board (12). The outlet (11) is formed through one of the at least one sidewall of the base (10).

The cover (20) corresponds to and is mounted on to the base (10) and around the HDD and has an inlet (21) formed through the cover (20) and at least one sidewall. The at least one sidewall of the cover (20) corresponds respectively to the at least one sidewall of the base (10), is mounted around the at least one sidewall of the base (10) and has at least one through hole (22). The at least one through hole (22) corresponds to the inserting holes (13) of the mounting board (12) and allows the HDD (40) to be connected to external power and electronic devices.

Figure 3:
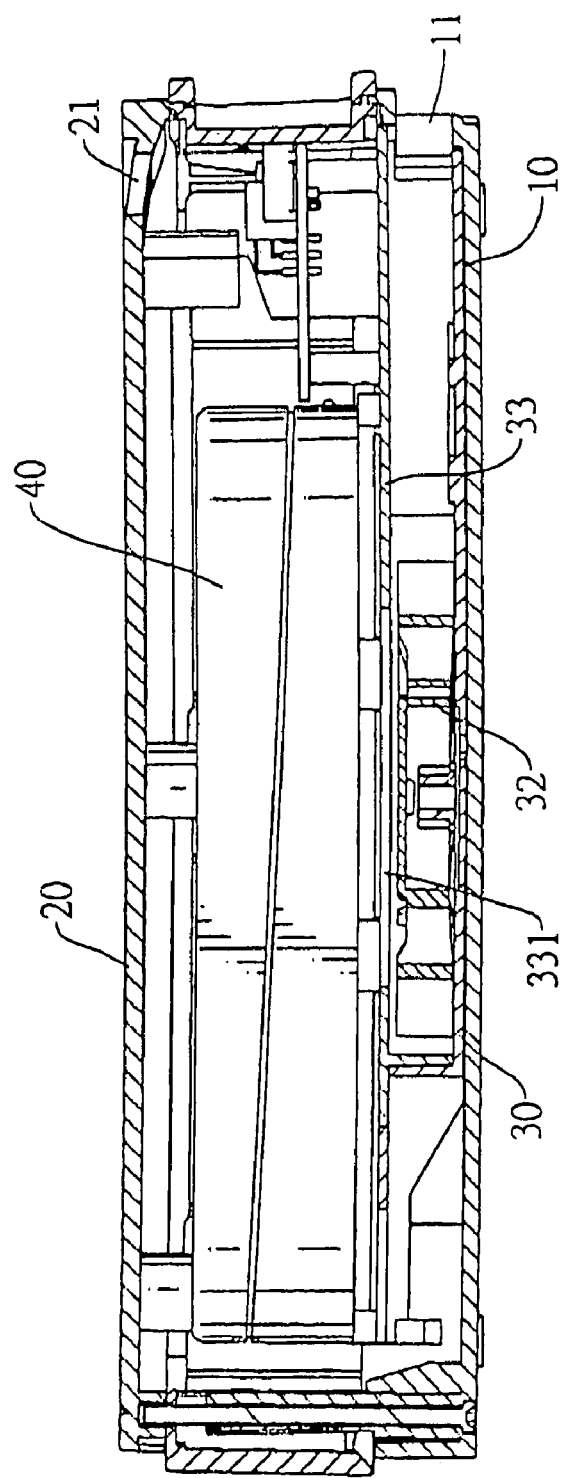
FIG. 3 is a bottom view in partial section of the HDD case in FIG. 1.

With further reference to FIG. 3, the fan assembly (30) is mounted on the inner surface of the base (10), is surrounded by the at least one sidewall of the base (10) and has a bracket (39), a hood (33) and a frame (34).

The bracket (39) of the fan assembly (30) is mounted on the inner surface of the cover (20) and has an airway (31) and a fan (32) and may further have multiple tab mounts (36) and multiple frame mounts (35). The airway (31) communicates with the outlet (11) and is flared. The fan (32) is mounted in the airway (31) and is rotated by a drive device to generate airflow. The tab mounts (36) are formed on the bracket (39) and are arranged around the airway (31). The frame mounts (35) are formed in the bracket (39) of the fan assembly (30).

Figure 4:
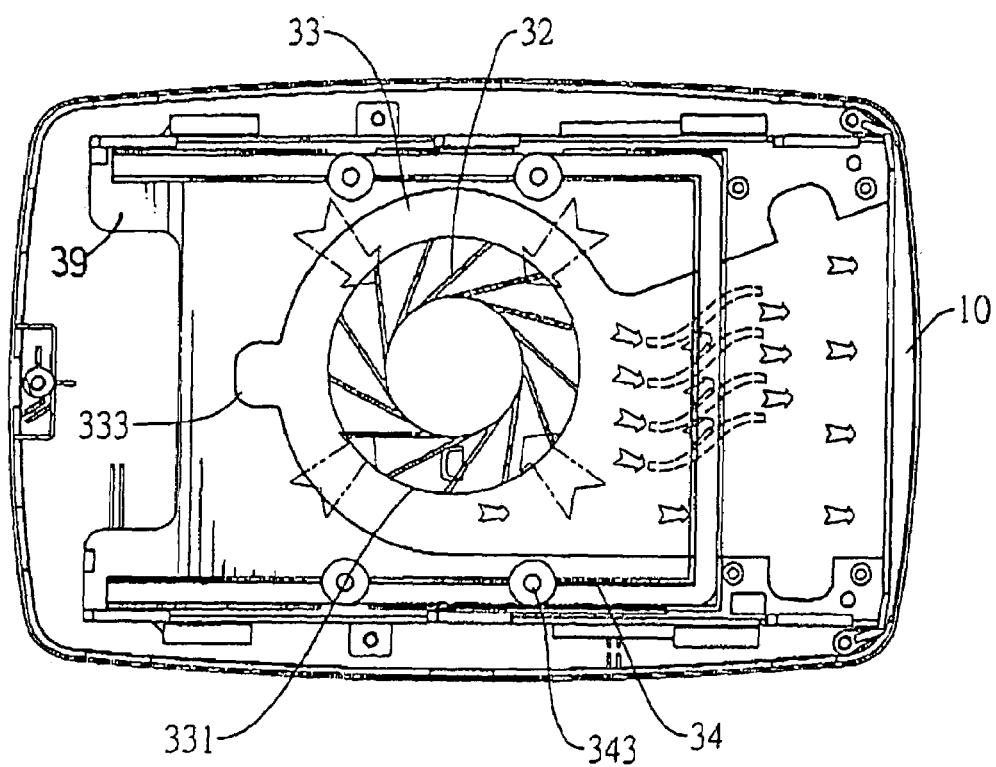
FIG. 4 is an operational front view of internal elements of the HDD case in FIG. 1.

With further reference to FIG. 4, the hood (33) corresponds to and covers the airway (31) to form a chamber and has an upper surface and a hole (331). The chamber is formed between the hood (33) and the airway (31) and communicates with the outlet (11) to allow air to flow out of the outlet (11). The upper surface may have multiple tabs (333) and a groove (332). The tabs (333) protrude from the upper surface of the hood (33), correspond to and are mounted respectively in the tab mounts (33) of the bracket of the fan assembly (30). The groove (332) is formed transversely in the upper surface. The hole (331) is defined through the hood (33), corresponds to the fan (32) and allows the fan (32) to extract air from the inlet (21) through the hole (331).

The frame (34) may be U-shaped, is mounted in the groove (332) of the hood (33) and has an intermediate segment (341) and two arms (342). The intermediate segment (341) of the frame (34) is mounted in the groove (332) of the hood (33). The arms (342) of the frame (34) are formed perpendicularly on and protrude the intermediate segment (341) and each arm (342) has multiple tabs (343). The tabs (343) of the arms (342) that correspond respectively to and are mounted respectively in the frame mounts (35) to keep the hood (33) mounted securely on the airway (31).

The circuit board (50) is mounted between the fan assembly (30) and the cover (20) and is connected to the HDD (40), the drive device in the fan (32) and a power source and electronic device.

When the fan (32) is operated, the fan (32) extracts air from the inlet (21). The air passes over the HDD (40) to remove heat from the HDD (40), then passes through the hole (331) and into the chamber of the fan assembly (30). Finally, the air and heat is blown out of the HDD case from the outlet (11). Thus, the fan (32) generates airflow without turbulence to eliminate heat efficiently.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A hard disk drive case for mounting around a hard disk drive comprising
   a base having
      an inner surface;
      at least one sidewall; and
      an outlet formed through the at least one sidewall of the base;
   a cover corresponding to and mounted on to the base and having
      an inlet formed through the cover; and
      at least one sidewall of the cover corresponding respectively to the at least one sidewall of the base, mounted around the at least one sidewall of the base and having at least one through hole;
   a fan assembly mounted on the inner surface of the base, surrounded by the at least one sidewall of the base and having
      a bracket mounted on the inner surface of the cover and having
         an airway communicating with the outlet and being flared; and
      a fan being mounted in the airway to extract air from the inlet of the cover and to expel the air toward the outlet of the base; and
   a hood corresponding to and covering the airway to form a chamber between the hood and the airway and communicating with the outlet and having a hole defined through the hood, corresponding to the fan to allow the fan to extract air from the inlet through the hole.

2. The hard disk drive case as claimed in claim 1, wherein
   the at least one sidewall of the base further has a mounting board protruding from the at least one sidewall and having multiple inserting holes defined through the protruding board; and
   the at least one through hole of the at least one sidewall of the cover corresponds to the inserting holes of the mounting board.

3. The hard disk drive case as claimed in claim 2, wherein
   the cover is rectangular and has four sidewalls and the through hole is formed through one sidewall;
   the base is rectangular and has four sidewalls and the mounting board protrudes from one of the sidewalls; and
   the outlet of the base is defined through one of the sidewalls of the sidewall.

4. The hard disk drive case as claimed in claim 1, wherein
   the bracket further has multiple tab mounts formed on the bracket and arranged around the airway; and
   the hood further has an upper surface with multiple tabs protruding from the upper surface of the hood, corresponding to and mounted respectively in the tab mounts of the bracket.

5. The hard disk drive case as claimed in claim 4, wherein
   the front of the fan assembly further has multiple frame mounts formed in the bracket of the fan assembly;
   the upper surface of the hood of the fan assembly further has a groove formed longitudinally in the upper surface; and
   the fan assembly further having a frame being U-shaped and mounted in the groove and having
      an intermediate segment; and
      two arms being formed perpendicularly on and protruding respectively from intermediate segment and each arm having multiple tabs, wherein the tabs of the arms correspond respectively to and are mounted respectively in the tab mounts to keep the hood mounted securely on the airway.

6. The hard disk drive case as claimed in claim 1 further having a circuit board mounted between the fan assembly and the cover.

* * * * *